Oct. 25, 1955
J. H. EDMAN
2,721,508
AUTOMATIC LOAD CONTROL FOR AGRICULTURAL
VEHICLE-IMPLEMENT OUTFITS
Filed Nov. 26, 1951
2 Sheets-Sheet 1
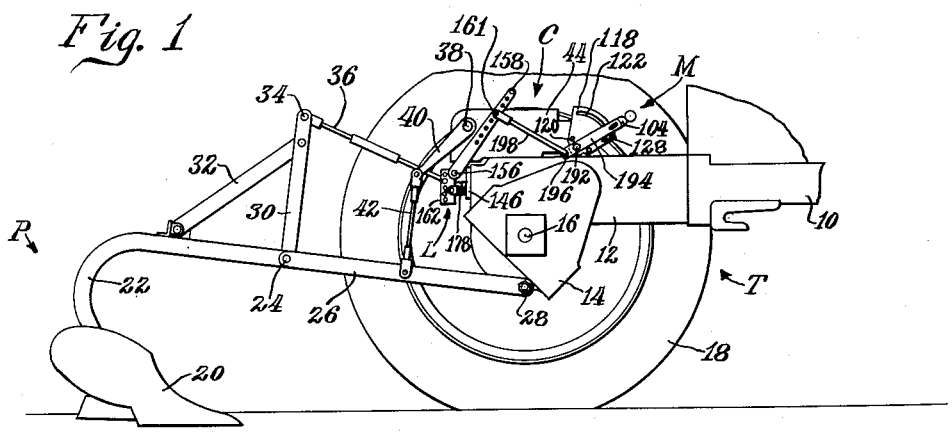
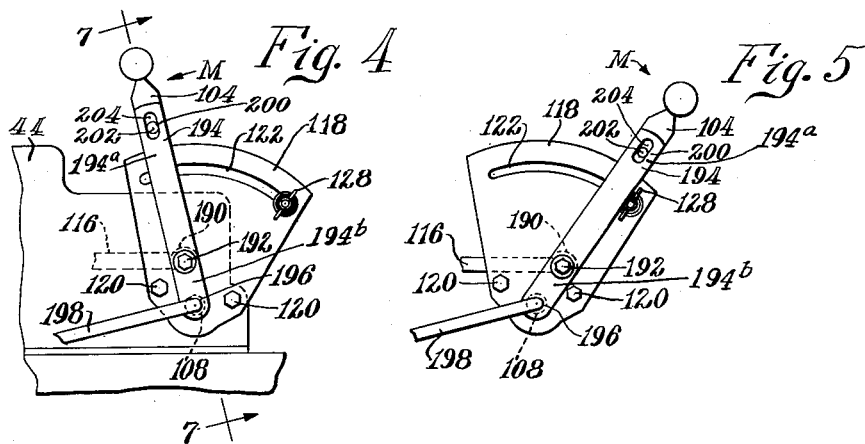
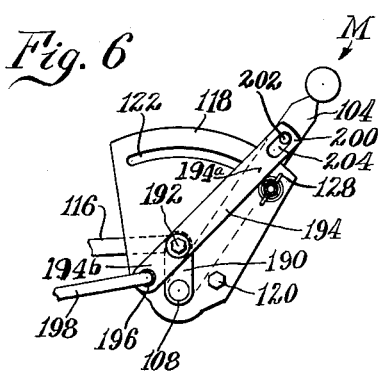
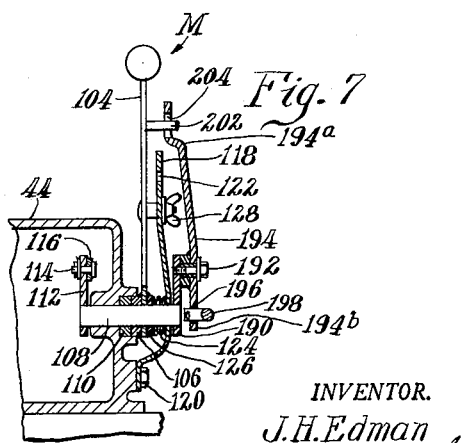
INVENTOR.
J. H. Edman
BY
Parker
Attorneys

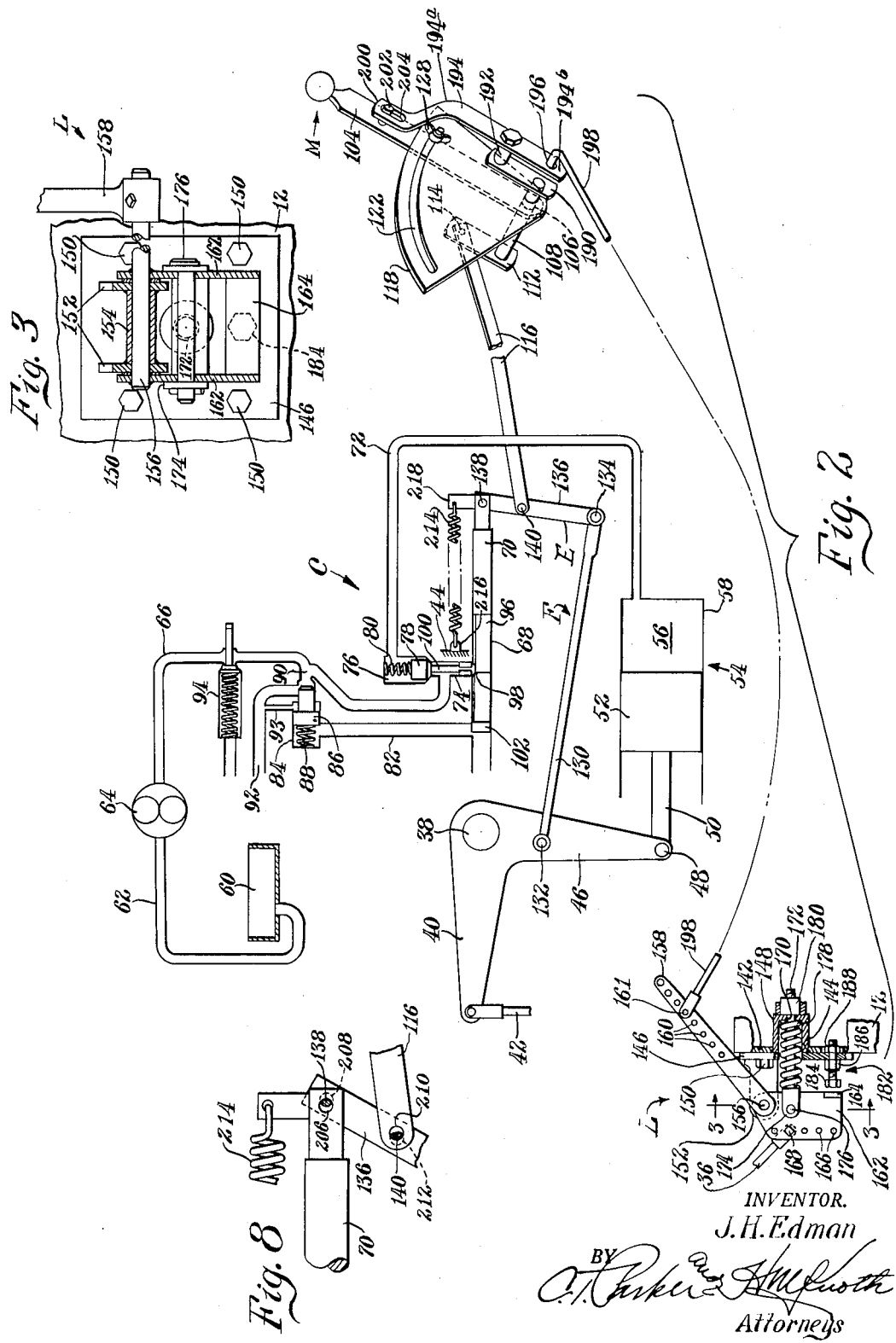

United States Patent Office 2,721,508
Patented Oct. 25, 1955

2,721,508

AUTOMATIC LOAD CONTROL FOR AGRICULTURAL VEHICLE-IMPLEMENT OUTFITS

John H. Edman, Dubuque, Iowa, assignor to Deere Manufacturing Co., Dubuque, Iowa, a corporation of Iowa Application November 26, 1951, Serial No. 258,231

12 Claims. (Cl. 97—46.03)

This invention relates to an agricultural vehicle-implement outfit or unit and more particularly to means for automatically controlling the operation of the outfit in accordance with variations in operating load imposed thereon as a working part of the implement encounters agricultural resistances of varying magnitude.

The invention is primarily applicable to that type of agricultural machine or outfit comprising a draft vehicle such as a tractor and a connected implement such as a plow or cultivator having a working part adapted to engage and work the ground. Although, as will be pointed out below, the invention has wider applicability to the agricultural field, such as in harvesters and conceivably elsewhere, the tractor-plow unit may be considered typical for purposes of explanation.

It is fundamental, of course, that as the tractor-plow unit performs a plowing operation, the draft load imposed upon the tractor will vary according to the resistances encountered by the plow and it is now common to provide means for adjusting the plow to shallower depths to decrease the draft load on the tractor in conditions in which the resistances to travel of the plow increase toward a magnitude in excess of the ability of the tractor, the most familiar example of which may be found in the disclosure of the U. S. patent to Ferguson 2,356,231.

Although the so-called draft or load-responsive control of the Ferguson and allied systems is ofttimes desirable, there are instances in which it is desirable to plow at a predetermined position of adjustment regardless of draft load, as with the so-called position-responsive control as disclosed, for example, in the U. S. patent to Worstell 2,477,710.

In recognition of the desirable advantages of both systems mentioned above, it is a feature of the present invention to provide mechanism in which both a load or draft control system is combined with a position-responsive control system so that the characteristics of both are available to the operator. As stated above, in he Ferguson system the position of the implement depends solely upon the magnitude of the draft load imposed on the vehicle by the plow. In the Worstell system, the position of the implement depends in the first instance upon the setting of a hand lever and the subsequent action of servo-means for returning the valve to neutral after the implement has attained its predetermined adjusted status. According to the present invention, the systems are combined by the superimposition of one upon the other, which is accomplished primarily by the addition of another follow-up means so that the operation of the hydraulic control valve or comparable control part for other types of power means is influenced first by the position of an operator-responsive means, second by the position of the working part of the implement, and third by load conditions resulting from the encountering by the working part of agricultural resistances of varying magnitude. An object of the invention is to provide means for changing from "load-control" to "position-control."

It is an object of the present invention to provide automatic load-control means as an attachment to an agricultural vehicle-implement outfit or unit of the type conventionally equipped with position-responsive control means. In this respect, the invention features an attachment that may be utilized without materially altering the basic components of the position responsive control system.

In a hydraulically controlled operating system, positioning of the valve is subject to factors adversely affecting its control because of lost motion or slack in the operating connections between the valve and the control or actuating parts to which it is connected. These adverse factors appear primarily in adjustment of the implement in a direction in which its operating effort is increased. In the case of a plow, for example, it is desirable that the increments of adjustment through which the plow is moved toward increased plowing depth be as small and accurate as possible. If the lost motion in the operating linkage or equivalent means is not adequately compensated for, setting of the hand lever will not always be reflected by immediate and true setting of the valve. Accordingly, the present invention provides biasing means of relatively uniform force acting on the force-transmitting connection between the valve and the operating means for eliminating slack in the operating means to the end that accurate positioning of the valve may be achieved. In particular, this phase of the invention finds greatest utility in a hydraulic system in which lowering or increased operating effort of the implement working part is accomplished by the opening of a check valve by the control valve. In a system such as that disclosed in the Worstell patent mentioned above, the control valve operates in a bore and has a ramp thereon selectively engageable with the operating member of a check valve that projects into the bore. When the valve is shifted in one direction, the ramp engages the check-valve-operating member to displace the check valve and thereby to control the exhaust of fluid from the fluid motor that controls the position of the implement part. When the hand lever is moved, it must operate not only to shift the control valve but also to displace the check valve. If slack occurs in the operating means, there will be an undesirable amount of movement of the hand lever before the check valve is picked up. According to the present invention, the biasing means is so arranged that the slack is taken up in the direction opposed to the direction of the line of force transmitted by the operating means when the hand lever is moved in such direction as to cause the control valve to unseat the check valve.

A still further object of the invention resides in the provision of an attachment means mountable on the vehicle-implement outfit for the purposes of coordinating the changes reflected by variations in draft load with desired changes in the power means. This attachment means preferably takes the form of an attachable support mountable on the vehicle and having a pair of arms thereon, one of which is connectible to the implement and the other of which is connectible to the power control means.

The foregoing and other important objects and desirable features inherent in and encompassed by the invention are achieved in one preferred form of the invention as disclosed in the following detailed description and accompanying sheets of drawings in which Figure 1 is a side elevational view of the rear portion of a typical tractor-plow outfit embodying the improved control means, the near rear wheel of the tractor having been omitted to expose the control and operating mechanism;

Figure 2 is an over-all schematic view, partly in section and partly in perspective, illustrating the various components involved in a preferred embodiment of the automatic load-control;

Figure 3 is a fragmentary sectional view on an enlarged scale as seen along the line 3—3 of Figure 2;

Figure 4 is a fragmentary side elevational view on an enlarged scale showing the relationship of the operator-responsive control means to the power control casing on a tractor;

Figures 5 and 6 are views similar to Figure 4 but showing different positions of the actuating parts;

Figure 7 is a transverse sectional view as seen along the line 7—7 of Figure 4;

Figure 8 is a fragmentary view on an enlarged scale and showing in somewhat exaggerated fashion the manner in which slack is taken up in the operating connections.

As stated above, an automatic load control following the principles of the present invention may have utility in many agricultural vehicle-implement outfits. However, since a tractor-plow outfit lends itself more conveniently to description, it has been selected for the purposes of the present disclosure. In this respect, it should be recognized that variations in the structural and functional relationships between the tractor and implement are readily available within the scope of the invention. For example, the tractor may comprise any vehicle rendered mobile by power means applied thereto and the plow or other implement, instead of being attachable or connectible to such vehicle, may be a part thereof, as in the instances of the various self-propelled machines known in the art. Accordingly, the disclosure in this respect should be taken as illustrative and not limiting. Again, the use of such expressions as "front," "rear," "raise," "lower," etc., are used in both the specification and claims as terms of convenience and are not intended to support the importation into the invention of unnecessary limitations.

The agricultural vehicle-implement outfit shown in Figure 1 comprises a tractor T and a plow P. The tractor may be of any commercial well-known construction and includes a longitudinal main body 10, the rear portion of which provides a conventional transmission and power train housing 12. In the particular tractor shown, the housing 12 is carried between a pair of depending housings (only one of which appears at 14) which in turn carry laterally outwardly extending axles (only one of which appears at 16). These axles are keyed to right- and left-hand traction wheels, the right-hand wheel being omitted from Figure 1 and only the left-hand wheel appearing at 18.

As is typical in tractors of this type, the tractor is provided with integral power means, designated generally by the letter C, for controlling the operating status of the plow P. The details of the power means will be described below.

The plow P comprises a plow bottom 20 connected to a not unconventional plow beam 22 which has its forward end pivotally connected at 24 to a forwardly extending draft or tension link 26. There may be at least a pair of such tension links, but for the purposes of the present disclosure it will be sufficient to consider that there is only one such link. The forward end of this link may be pivotally connected as at 28 to an appropriate mounting provided at the bottom of the depending housing 14. By the means just described, the plow P is draft-connected to the tractor T.

Rigid on the plow beam 22 and upstanding therefrom is a mast 30, braced at 32 to the plow beam 22 and having at its upper end a pivotal connection at 34 with a forwardly extending control member in the form of a compression link 36. The plow is shown as operating at a selected plowing depth and, accordingly, draft forces of a predetermined value will be transmitted between the tractor T and plow P. These draft forces and variations therein will be reflected in transmission of forwardly acting forces through the compression link 36 to the tractor T and subsequently to the power means C through load-reflecting means designated generally by the letter L. As a result of variations in draft load, the power means C is caused to adjust the working status and consequently the working effort of the working part represented by the plow bottom 20, this adjustment being accomplished by means of a rockshaft 38 included in the power means C and having a work member or power-transmitting arm 40 connected by a lifting link 42 to the tension link 26 of the draft connection between the tractor and plow. To the extent just described, the disclosed system follows generally part of the structure referred to in the Ferguson patent identified above.

The power means C comprises a casing 44, within which is contained much of the system illustrated schematically in Figure 2. This casing journals in any appropriate bearing (not shown) the previously described rockshaft 38, and the lifting arm 40 is mounted exteriorly of the casing. Within the casing 44, there is secured to the rockshaft 38 an operating arm 46 pivotally connected at 48 to a piston rod 50 of a piston 52 forming part of a fluid motor 54. The other part of the motor 54 consists of a fluid-expansible chamber 56 contained within a cylinder 58 within which the piston 52 reciprocates.

The power means is powered by a hydraulic system contained either completely within the casing 44 or in part in the casing 44 and in part in the tractor transmission housing 12. These details are relatively unimportant here.

The hydraulic system comprises a sump 60 having a fluid line 62 leading to a pump 64. This pump may be conventionally driven from any suitable mechanism on the tractor. The pump transmits fluid under pressure through a line or conduit 66 to a valve bore or chamber 68 appropriately formed in the casing 44. The Worstell patent referred to above illustrates a typical design that could be used here. A generally cylindrical control valve 70 is shiftable axially selectively in opposite directions in the bore 68 to control the transmission of fluid under pressure selectively to or from the motor 54 via a line or conduit 72.

In the particular system shown, the line 66 communicates with the chamber or valve bore 68 via a port 74 that intersects the bore 68 at a right angle. Coaxial with the port 74 is a check valve chamber 76 which controls communication between the valve bore 68 and the fluid-pressure-transmitting line 72 to the motor 54. A check valve 78 is biased by a spring 80 to normally close the check valve chamber 76 and to cut off communication between the bore 68 and the line 72, and thus to isolate the motor 54 from the pump 64.

One end of the valve bore 68 communicates via a passage 82 with a differential valve chamber 84 in which is carried a differential valve 86 biased by a spring 88 in such direction as to close a short passage 90 formed at the intersection of the high-pressure line 66 and an exhaust line 92.

A small relief passage 93 interconnects the exhaust line 92 and the right-hand end of the differential valve chamber 84 for the purpose of relieving any pressure that builds up ahead of the differential valve 86 within the chamber 84. A conventional overload relief valve 94 may be interposed in the high-pressure passage or line 66.

The control valve 70 is provided intermediate its ends with a reduced portion 96 to provide for the transmission of fluid under pressure at times between the port 74 and the passage 82. An adjacent portion 98 of the control valve 70 provides means for effecting the displacement of the check valve 78 via engagement with a check-valve-operating member 100 comprising a stem on the check valve 78. The extreme left-hand end of the control valve 70 is in the form of a head 102 of such outside diameter as to be slidably received in the bore 68 and to constitute means controlling the transmission of fluid under pressure between the port 74 and the passage or line 82.

The operation of the hydraulic system will be briefly described without prior reference to the components that control the system. The position of the control valve 70 in Figure 2 is its neutral position. This valve is settable in this position or selectively settable in either of two active positions for selectively activating the power means to cause appropriate adjustment of the implement or plow P. While the valve 70 is in its neutral position, transmission of fluid by the pump 64 through the line 66 causes opening of the differential valve 86 as shown so that the fluid may return via 90 and 92 to the sump 60. This result obtains because the check valve 78 is closed; and, although the area presented by the left-hand end of the differential valve 86 is larger than that presented by the right-hand end, there is no pressure at the left-hand end of the valve other than that exerted by the biasing means or spring 88. Hence, the pressure in the line 66—90 is sufficient to open the differential valve 86 for the exhaust of fluid pressure via 92. No fluid can pass from the line 66 via the port 74 and the fluted end of the check valve stem 100 and along the valve bore 68 toward the passage 82, because the enlarged headed end 102 of the valve 70 cuts off communication between the bore 68 and the passage 82. Therefore, the pump 64 will circulate fluid at no appreciable pressure.

When the control valve 70 is shifted to the left (as viewed in Figure 2), fluid-pressure communication is established between the line 66 and the line 82 via the port 74 and the reduced portions 96 and 98 of the control valve. Because of the larger area presented by the left-hand end of the differential valve 86, plus the bias of the spring 86, the differential valve will close the port at 90, causing a sufficient rise in pressure to open the check valve 78 so that the fluid pressure is transmitted to the right-hand end of the piston 72 in the fluid motor 54, resulting in movement of the piston to the left and rocking of the rockshaft 38 in a clockwise direction for exerting a lifting force through the lifting link 42 on the plow P.

When the valve 70 is returned to its neutral position, the line 82 is disconnected from the valve bore 68, the exhaust port 90 is opened to the exhaust line 92 and the spring 80 returns the check valve 78 to its normally seated or closed position. Thus, the motor 54 is hydraulically locked and the implement cannot settle from its raised position.

When the valve 70 is shifted to the right as viewed in Figure 2, the check-valve-operating portion 98 on the valve 70 serves as a ramp for unseating the check valve 78 against the bias of the check valve spring 80. Since no change is made in the relationship between the valve bore 68 and the passage 82, the differential valve 86 is still subject to be opened by fluid transmitted through the line 66 by the pump 64. Consequently, the weight of the implement, acting through the link 42, bell crank 40—46 and rockshaft 38, causes movement of the piston 52 to the right in the cylinder chamber 56, thus exhausting fluid through the line 72 to the check valve chamber 76, whence it returns via 66—90—92 to the reservoir or sump. When the control valve 70 is again returned to its neutral position, the check valve 78 seats and the implement is prevented from lowering beyond the point at which the control valve 70 is moved to neutral position.

As previously stated, it is one of the prime objects of the present invention to arrange the system so that the control valve 70 is influenced by three factors: (a) Adjustment of operator-responsive means, (b) position or working status of the implement, and (c) the reflection of operating loads resulting from the encountering by the implement working part (here the plow bottom 20) of agricultural resistances (here variations in soil conditions) of varying magnitude, which resistances result in the imposition of varying draft loads on the vehicle (although loads other than draft loads could be considered to be imposed upon an agricultural power source other than the draft or propelling source represented by the vehicle).

The first of these three factors—adjustment of the operator-responsive means—is presented by operator-responsive means, which means is designated generally by the letter M and comprises a selectively positionable and settable hand lever or operating means 104 rockable on support means, afforded by the power means casing 44, by being journaled at 106 on a short rockshaft 108. This rockshaft is appropriately journaled or rockably carried by a bearing 110 (Fig. 7) in a forward portion of the casing 44. The inner end of the rockshaft is enclosed by the casing 44 and has fixed thereto a short upstanding arm 112. The free end of this arm is pivotally connected at 14 to the forward end of a rearwardly extending control-initiating member or first force-transmitting means or link 116, which serves, in conjunction with equalizing means E as outlined below, to connect the arm to the valve 70.

The position of the hand lever 104 in its range of adjustment is retained by means cooperating with a sector 118 secured to the exterior of the casing 44 as by a pair of cap screws 120 and having therein an arcuate slot 122 formed with the rockshaft 108 as its center. A coiled compression spring 124 encircles the rockshaft 108 (Fig. 7) and acts between the inner face of the sector 118 and a washer 126 to urge the washer against the opposed face of the hand lever 104. The washer 126 may be of any appropriate friction material so that the spring 124 serves to retain any selected adjusted position of the lever 104 relative to the sector 118. Any other suitable retaining means could be provided, several examples of which are known in the art. An adjustable stop 128, preferably comprising a bolt and wing nut, is settable at selected positions along the length of the arcuate slot 122 for the purpose of determining a limit on the extent of angular movement of the lever 104 in one direction. In the present case, this direction is the direction of movement of the lever 104 such as to effect lowering of the plow P.

The second factor influencing the position of the control valve 70—the adjusted position of the implement—results in control of the valve 70 by follow-up means, designated generally by the letter F, connected between the valve 70 and the arm 46 on the rockshaft 38. The arm 46 is selected for this purpose merely because it is convenient. Any other part reflecting the adjusted position of the implement could be utilized as well. However, since the means F is by itself old and many equivalents thereof are available, further detailed description is thought to be unnecessary apart from the general description of the operative connection between the implement and the power means C.

As shown in Figure 2, the follow-up means includes a follow-up member or link 130 pivoted at 132 to the arm 46 of the bell crank 40—46 and pivotally connected at its forward end at 134 to the equalizing means E, shown here as comprising a movable part in the form of a lever 136. The end of the lever 136 opposite to that at which the connection 134 is made is pivotally connected at 138 to a forward extension of the control valve 70. The lever is connected intermediate its ends by a pivotal connection 140 to the rear end of the initiating member or link 116.

To the extent thus far described, it will be seen that the control valve 70 is connected by a so-called differential linkage connection to be controlled by either the means M or F in such sequence that shifting of the valve 70 in one direction by the means M is followed by a return of the valve 70 to its neutral position through the medium of the means F.

This result will be more readily understood if it is temporarily considered that the control lever 104 is fixed to the rockshaft 108. Thus, if the lever 104 is moved in a counterclockwise direction, a rearward force will be transmitted by the initiating link 116 to the lever 136. Since the position of the implement is fixed, the pivot at 134 will constitute a fulcrum about which the lever 136 will swing in a counterclockwise direction under influence of the rearward force exerted by the link 116, resulting in movement of the valve 70 to the left. As previously stated, this causes movement of the fluid motor piston 52 to the left and results in raising of the plow P. After the lever 104 is moved in a counterclockwise direction, it is retained in its new position by the retaining means 124—126 and consequently the position of the link 116 is fixed so far as concerns its ability to move forward or rearward unless influenced by the operator. Therefore, as the arm 46 swings in a clockwise direction upon raising of the implement, a rearward force is exerted thereby through the follow-up member 130 against the lower end of the lever 136. Since the link 116 is fixed in position, the pivot 140 becomes the fulcrum for the lever 136; and as the lower end of the lever 136 swings rearwardly, its upper end will swing forwardly or in a clockwise direction, thus moving the valve 70 forwardly from its rearward or "raise" position. The various lever arms are calculated so that the control valve 70 will be returned to its neutral position from either of its active positions. Mechanism of this character and functioning in like manner is disclosed in the Worstell patent referred to above.

However, since in the present instance the hand lever 104 is journaled on rather than being fixed to the rockshaft 108, certain principles of the Worstell invention are departed from here. Such departure is necessary to coordinate in the system the automatic load control under influence of the means L, which represents the third factor having operational characteristics reflecting position changes of the control valve 70.

As stated above, it is a feature of the present invention to provide the load-reflecting means L in the form of an attachment to a tractor of a well-known type. In this particular case, the rear part of the tractor body comprising the transmission and power train housing 10 has an upright rear wall 142 provided with a preferably circular opening 144. The load-reflecting means, when provided as an attachment, comprises a support 146 having rigid therewith and projecting normally therefrom a hollow portion or sleeve 148. This sleeve is inserted through the opening 144 and the support has means, such as a plurality of cap screws 150, for rigidly securing the support to the rear wall 142 of the body part 12 of the tractor. The support further includes a pair of brackets or bearing means 152 in the form of apertured ears interconnected by a transverse sleeve 154 for journaling or rockably carrying a short rockshaft 156.

This rockshaft projects at one side of the support and has fixed thereto an upwardly and forwardly extending control arm or shiftable part 158. The free end of this arm is provided with a plurality of apertures 160, any selected one of which may receive a connecting pin 161 for purposes to presently appear.

Also rigidly fixed to the load-reflecting rockshaft 156 is an actuating arm comprising a pair of depending plates 162 spaced apart axially of the rockshaft 156 and cross-connected at their lower ends by a transverse bar 164. Each of the plates is provided with a series of vertically spaced apertures 166, any selected one of which may receive a connecting pin 168 for effecting a connection between the arm 162—164 and the forward end of the control or compression link 36.

The sleeve or hollow portion 148 of the support is closed at its inner end except for an aperture 170 which loosely receives a partially threaded shank 172 of a rod that has its rear end formed as a clevis 174 connected by a pivot pin 176 to the arm 162—164 below the rockshaft 156. A coiled compression spring 178 encircles the rod 172 and acts between the clevis 174 and the closed inner end of the sleeve 148 to constitute biasing means exerting a rearward pressure against the arm 162—164. Thus, rocking of the rockshaft 156 in a counterclockwise direction through the medium of the compression link 36 is resisted by the biasing means or spring 178.

The leverage on the arm 162—164 may, of course, be varied by adjusting the connection between the link 36 and the arm via the adjusting apertures 166 and the connecting pins 168. The design illustrated is merely representative of many forms that this adjustment could assume.

Angular movement of the rockshaft 156 in a counterclockwise direction may be varied or even prevented by an adjustment provided at 182, which may comprise a cap screw 184 and lock nuts 186 and 188. As will be apparent from an examination of the lower left-hand corner of Figure 2, the position of the head of the cap screw 184 in cooperation with the transverse bar 164 on the plate arms 162 will determine the extent, if any, of angular movement permitted for the rockshaft 156. This provides a lockout against "load-control" action.

A tractor such as the tractor T having the power means C including the casing 44 will customarily be equipped with the rockshaft 108, arm 112, and connecting links and levers 116, 136, 130, a control valve comparable to the valve 70, and means comparable to the sector 118. In some cases, it may be expedient to modify this design merely by the addition thereto of a substitute hand lever 104 or to modify the original hand lever so that it is journaled on the rockshaft 108 rather than being fixed thereto. Original equipment will include the rockshaft 108 as having its inner portion enclosed within the casing 44 and its outer portion exteriorly of this casing. According to the preferred embodiment of the present invention, there is keyed or otherwise fixed to the outer end of the rockshaft 108 a second arm 190 in addition to the arm 112. Because of the relative lengths and positions of the arms 112 and 190, one or the other could be omitted and the connection at 114 of the forward end of the initiating link 116 could be made to the single remaining arm. However, for the purposes of accommodating the design to existing constructions, the present expedient is resorted to so that the arm 112 may remain within the casing 44 and so that the arm 190 may be disposed exteriorly of the casing for connection to the load-reflecting means L. If the existing rockshaft 108 is used, the arm 190 will be secured to the outer end thereof. If a substitute rockshaft is used, the arrangement may include such rockshaft, the two arms 112 and 190, and other parts to be described, as a conversion kit for modifying a tractor and power means of existing designs. In either case, the principles of the invention will be readily applicable on the basis of the present disclosure.

The free end of the second or exterior arm 190 is provided with a pivot 192 on a transverse axis spaced from and parallel to the axis of the rockshaft 108. This pivot 192 affords a mounting means or connection for a load-responsive lever 194, the pivot being preferably intermediate the ends of the lever 194 to provide first and second arms 194a and 194b. Since the particular lever 194 shown here is upright, the first arm 194a is above the pivot 192 and therefore may be considered an upper arm and the second arm 194b is below the pivot 192 and therefore may be considered a lower arm. However, these details are not critical. The lever 194 is parallel to the arm 190 and has the lower end of its arm 194b substantially in transverse alinement with the lower end of the arm 190, at which point a pivot 196 preferably coaxial with the rockshaft 108, affords a connection between the arm 194b and the forward end of a force-transmitting means or link 198. This force-transmitting means, being in addition to the first force-transmitting means 116, previously described, and further being connected to the lower arm 194b, may be considered a second or lower force-transmitting means. The rear end of the link 198 is connected at 161 to any selected one of the apertures 160 in the load-reflecting arm 158 on the rockshaft 156. The link 198 is preferably capable of transmitting forces in both compression and tension.

The two levers 104 and 194 are connected together by force-transmitting means designated generally by the numeral 200. This means preferably includes an articulate connection comprising a pin or stud 202 fixed to and outstanding from the hand lever 104 and passed through a slot 204 in the upper arm 194a of the lever 194. The force-transmitting means 200, being additional to the first force-transmitting means 116 and second force-transmitting means 198, and further being connected to the upper arm 194a, may be considered a third or upper force-transmitting means. Here, as elsewhere, mere directional characteristics of the structure are those of a particular disclosure and may be altered within the scope of the invention. As will be apparent from the description of the operation of the load-control means to follow, the combined relationship of the lever 194, arm 190, and force-transmitting connection 200 is such as to constitute means whereby the two levers 104 and 194 may be moved at times in unison and at other times relative to each other.

Figure 8 represents a schematic illustration in somewhat exaggerated fashion of slack or play that will occur at certain of the articulated connections between the means M and the control valve 70. Since the means M is related to the means F and L, the presence of such slack or lost motion will be reflected in inefficient operation of the valve 70 by any one of the three means. Accordingly, it is expedient to eliminate this slack. Normally, the presence of slack is occasioned by even normal tolerances in manufacture and assembly. As shown in Figure 8, the connection at 138 comprises a pivot pin passed through apertures 206 and 208 respectively in the end of the control valve 70 and the upper end of the lever 136. A similar situation exists as to the connection at 140, wherein the possible offsetting of apertures 210 and 212 formed respectively in the link 116 and lever 136 results in lost motion relative to the pivot pin included in the connection 140. In order that this slack may be eliminated in at least one direction, the present invention features the inclusion of a tension spring 214 appropriately anchored, as at 216, to an interior portion of the casing 44 and connected at its other end to an upstanding lug 218 fixed to the forward end of the control valve 70. As illustrated, the spring exerts a biasing force rearwardly or to the left against the control valve 70. Without the presence of the initiating link 116 and the settable hand lever 104, the spring 214 would bias the valve 70 in that direction thereof causing raising movement of the implement. In a comparable situation, raising movement of the implement would be the equivalent of the adjustment of a similar implement working part in a direction of decreased operating effort.

However, since the settable operating lever 104 forms in effect an anchor for the forward end of the link 116, the spring 214 is opposed by the force-transmitting connection comprising the link 116. This causes the slack in the linkages and pivotal connections to be taken up as shown in Figure 8. In other words, the direction of the biased load imposed by the spring 214 is opposite to that exerted by the operating lever 104 when moved in its clockwise direction (or the direction in which it is moved to effect lowering of the implement). Since it is such clockwise movement of the lever 104 that effects positive opening of the check valve 78 via the control valve portion 98, the portion 98 is immediately in engagement with the lower end of the stem 100 of the check valve 78 and there is no lost motion to take up as the lever 104 is shifted forwardly. Therefore, opening of the check valve 78 occurs immediately in response to forward shifting of the lever 104 and not subsequently after lost motion is eliminated. This is important from the standpoint of providing a large number of relatively infinitesimal increments of lowering adjustment. It is in this range or direction of adjustment that the operator desires the maximum and most accurate control of the implement, since he is concerned primarily with increased depth of operation of a plow, for example. Stated otherwise, raising of the implement is normally manually effected only at the end of a row or furrow and accurate adjustment is relatively immaterial as long as the plow is raised to a "transport" position. However, in the resetting of the plow manually, renewed operation at a desired depth is important. At the same time, finer increments of adjustment in raising are desired when operating in "load control."

In connection with the biasing means 214, it should be noted that the valve 70 is axially hydraulically balanced; that is, there are no unequal areas opposed to fluid pressure that would result in bias of the valve one way or the other because of such fluid pressure.

A spring is used as distinguished from other biasing means, because a spring will more nearly give a positive relatively uniform bias contributing to accurate follow-up action. The force exerted by the spring varies between the limits of the minimum tension in the spring when the valve is in its full raising position and the maximum tension when the valve is in its full lowering position. Of importance is the fact that the critical performance is just as the control valve approaches its neutral position. This result provides, at least for downward adjustment of the implement, many increments of adjustment that are almost infinitesimal in size.

On the basis of the design illustrated, it is preferred to use a spring having a free length on the order of between six to eight inches and having on the order of from eighty to one hundred twenty coils approximately .4375" outside diameter made up of spring wire of .054" diameter. These dimensions can, of course, be varied but are given here as examples of the particular characteristics availed of on the basis of the present design.

*Operation*

With the tractor-plow unit stationary and the plow in its fully raised or "transport" position, the starting position of the hand lever 104 will be as shown in Figure 4. Since the implement is hydraulically fixed in its transport position, there will be no force exerted in either direction through the load-reflecting servo-means or link 198. Therefore, the pivot at 196 between the link 198 and load-reflecting lever 194 will be coincident with the axis of the rockshaft 108. The arrangement is designed for normal positioning in this respect. When the pivot 196 is fixed as aforesaid, the lever 194 becomes in effect a part of the lever 104, primarily by virtue of the force-transmitting connection at 200, the pivot at 192, and the arm 190. As previously stated, the arms 190 and 112 may be considered one and the same for all practical purposes, apart from the interior disposition of the arm 112 and the exterior disposition of the arm 190.

The control valve 70 will, of course, be in its neutral position as shown in Figure 2. It will be assumed that the variable limit means 182 is set as shown in Figure 2, so that at least some angular movement of the load-reflecting arm 162—164 is possible. Now, with the pivot 196 coaxial with the rockshaft 108, and the levers 104 and 194 moving as one, the fully lowered position of the implement is achieved by movement of the hand lever 104 to the position of Figure 5. This position is determined by setting of the stop 128. The set position illustrated is the maximum position; although, any intermediate position could be selected. Whichever selected position is chosen determines the maximum depth at which the plow will operate.

Since the levers 104 and 194 move as one, it may be considered that the lever 104 is fixed to the rockshaft 108. Therefore, forward movement of the lever 104, or movement thereof in a clockwise direction, will exert a forward force on the link 116. Since the position of the implement is fixed, the pivot at 134 becomes the fulcrum for clockwise swinging of the lever 136 by means of the link 116, resulting in forward shifting of the control valve 70. This, as explained above, positively unseats the check valve 78 and allows the implement to lower by its own weight, fluid being exhausted from the motor chamber 56 via the line 72, chamber 76, line 66, port 90 (the differential valve 86 is open), and exhaust line or passage 92. When the plow attains its lowered position, the arm 46, moving in a counterclockwise direction, exerts a forward force through the link 130 on the lower end of the lever 136. The pivot 140 is now fixed because of the set position of the hand lever 104 and serves as the fulcrum for counterclockwise rocking of the lever 136 to return the control valve 70 to its neutral position. During all these phases of operation, the pivot 196 between the load-reflecting lever 194 and load-reflecting link 198 is stationary and coaxial with the rockshaft 108.

In the foregoing description of the operation, it is assumed that the tractor will be driven forwardly as the implement is lowered so that the plow can enter the ground to its maximum plowing depth. Otherwise, downward movement of the plow would be stopped by the surface of the ground. As will be explained below, the selected implement position is modified by operation of the automatic load-control.

If the soil conditions are fairly equal during the initial stages of travel of the tractor-plow outfit, the plow will remain at the selected working depth and there will be no changes in the positions of the various components of the control system. However, as soon as the plow encounters, say, more tightly packed soil, there is presented to the forward travel of the plow an agricultural resistance of a magnitude in excess of that initially selected. Consequently, the draft load on the tractor is increased. This results in a tendency for the plow beam 22 to pivot in a clockwise direction about the pivot 24 between the beam 22 and the tension link 26. Such movement transmits a compression force through the compression link 36 to the load-reflecting means L. Specifically, the rockshaft 156 is rocked in a counterclockwise direction, resulting in a rearward movement of the upper end portion of the load-reflecting arm 158. As the arm 158 moves in a counterclockwise direction, or rearwardly, it pulls on the link 198 to displace the lower portion 194b of the load-reflecting lever 194 rearwardly about the pivot 192. At this stage, the force-transmitting connection 200 between the levers 104 and 194 constitutes a fulcrum, since the position of the lever 104 is fixed by the retaining means 124—126. The consequent movement of the load-reflecting lever 194 is represented in Figure 6, wherein it will be seen that the stud or pin 202 serves as a pivot or fulcrum for the upper end 194a of the lever 194 as the lower end 194b of this lever is moved rearwardly by force exerted rearwardly by the link 198. Since the arm 190 on the rockshaft 108 is pivoted to the lever 194 intermediate the ends of this lever, rearward swinging of the lower portion of this lever causes the arm 190 to swing in a counterclockwise direction and consequently to rock the rockshaft 108 in the same direction. Rocking movement of the rockshaft 108 as aforesaid is transmitted rearwardly through the link 116 to the lever 136. The rockshaft 38 is, of course, fixed and therefore the pivot 134 becomes a fulcrum about which the lever 136 is swung in a counterclockwise direction to shift the valve 70 to the left, followed by closing of the differential valve 86, a pressure rise in the high-pressure passage 66, opening of the check valve 78, and transmission of fluid under pressure through the line 72 to the cylinder chamber 56, following which the piston 52 moves to the left to rock the rockshaft 38 in a "raising" or clockwise direction to move the plow bottom 20 to a shallower plowing depth. The magnitude of the change in depth will depend, of course, upon the extent of angular movement of the load-reflecting arm 158, which will be reflected in the extent of movement of the valve 70 in its raising direction and consequently the extent of follow-up movement necessary to restore the control valve to its neutral position.

Since the setting of the plow to plow at a shallower depth is consistent with the ability of the tractor to exert a draft load of a predetermined value on the plow, it is expected that forward travel of the outfit will continue. The excess resistances set up by the soil may be merely a temporary condition and subsequently the texture of the soil may be such as to decrease the magnitude of the resistance to forward travel of the plow. Consequently, the draft load imposed upon the vehicle is decreased and the spring 178, being no longer compressed by the compression link 36, will expand to effect rocking of the rockshaft 156 in a clockwise direction. This will exert a force in compression through the link 198 to the lower end of the load-reflecting lever 194 to return this lever to the position of Figure 5. As the lever returns to this position, it causes rocking of the control rockshaft 108 in a clockwise direction so as to pull forwardly on the initiating link 116. The lever 136 then fulcrums about the fixed pivot 134 to effect forward shifting of the control valve 70, followed by lowering of the implement to its former or some other increased operating depth within the maximum limit. It is expected that the maximum limit will not be exceeded, primarily because the adjusting nut 180 on the threaded rod 172 limits cloockwise rocking of the rockshaft 156.

On the basis of the disclosure so far, it will be seen that all the advantages of a so-called draft-control system are available according to the present invention. Likewise, there has been provided in addition to the draft-control system means for limiting the maximum depth at which the plow will operate, together with the availability to the operator of all the advantages of the position-responsive control system as exemplified by the patent to Worstell. For example, the variable limit means 182 may be so set that the head of the cap screw 184 is in permanent contact with the crossbar 164 of the load-reflecting actuating arm 162—164, which will result in locking out the load control. Since this will result in eliminating any possible movement of the load-reflecting arm 158, the pivot at 196 becomes fixed in its normal position coaxial with the rockshaft 108. Thereupon, the two levers 104 and 194 operate as one and the means is operator-responsive to selectively control the position of the implement according to the means M and F.

In further explanation of the effect of the biasing means 214 on the system, it should be said that the force exerted by the biasing means is sufficient to overcome all frictional resistances, in addition to taking up the slack or play in the articulate joints. Figure 8 represents the slack in only two of the joints; although, it will be apparent that slack or lost motion may occur as well at 114, 134, 132, 192, 196, and 200.

*Summary*

As previously indicated, it is one of the features of the invention to provide a conversion attachment for utilization in a tractor of the type equipped with position-responsive control so that this tractor may have the combined advantages of that control plus load-responsive control. For this purpose, the operator-responsive means is modified as outlined above and the load-reflecting means is additionally provided as an attachment for use in conjunction with the means M. The entire organization may be adapted to the tractor without materially altering the basic tractor construction. It will be clear, of course, that the principles of the invention can be utilized for the adaptation of other agricultural control systems to the functions and results achieved in that disclosed here.

Various other features and advantages not specifically enumerated herein will undoubtedly occur to those versed in the art, as likewise will numerous modifications and alterations in the preferred embodiment of the invention illustrated, all of which may be achieved without departing from the spirit and scope of the invention as defined in the appended claims.

What is claimed is:

1. For an agricultural vehicle-implement outfit of the character in which the implement has an agricultural working part adjustable by power means through a range of adjustment in which the part encounters agricultural resistances of varying magnitude which accordingly vary the operating load imposed on the vehicle, and in which the power means includes a selectively settable and resettable actuating member for activating and deactivating the power means, a positionable initiating member, a rockshaft connected to and rockable for positioning the initiating member, a follow-up member operative in response to changes in adjustment of the implement part, and equalizer means interconnecting the three members and including a movable part for effecting initial setting and subsequent resetting of the actuating member respectively by the initiating member and the follow-up member: an automatic load control mechanism, comprising a settable operator-responsive lever having means for the journaling thereof coaxially with the rockshaft; an arm fixable on the rockshaft; a load-responsive lever having means for the pivoting thereof on the arm; normally stable load-reflecting means connectible to the vehicle-implement outfit and capacitated to reflect variations in operating loads imposed on the vehicle; means pivotally connecting the load-reflecting means to the load-responsive lever offset radially to one side of the pivot of the load-responsive lever to the arm; and force-transmitting means, including a pivot offset radially to the other side of the pivot of the load-responsive lever to the arm and connecting the operator-responsive lever to the load-responsive lever, whereby the pivot of the load-responsive lever to the normally stable load-reflecting means serves as a fulcrum for rocking of the load-responsive lever by the operator-responsive lever to rock the rockshaft via the arm to position the initiating member, and the pivot in the connection of the load-responsive lever to the set operator-responsive lever serves as a fulcrum for rocking of the load-responsive lever by the load-reflecting means to rock the rockshaft via the arm to position the initiating member.

2. For an agricultural vehicle including an adjustably positionable implement-connectible element and power means for adjusting the element, in which the power means has a casing enclosing an actuating member selectively settable and resettable to activate and deactivate the power means, a rockshaft having a portion exterior to and another portion inside the casing, an initiating member within the casing and positionable by the rockshaft, a follow-up member operative in response to adjustment of the implement-connectible part, and equalizer means interconnecting the three members and including a movable part for effecting initial setting and subsequent resetting of the actuating member respectively by the initiating member and the follow-up member: an automatic control mechanism for effecting rocking of the rockshaft from at least two external sources, comprising an arm fixable to the exterior portion of the rockshaft; a first lever having means for the rockable mounting thereof on the casing in proximity to the exterior portion of the rockshaft and the arm to be selectively fixed or to be moved angularly at times relative to the arm and rockshaft; a second lever pivoted intermediate its ends to the free end of the arm for swinging about an axis parallel to the rockshaft axis; a force-transmitting connection interconnecting the two levers, including a pivot parallel to both of the aforesaid axes and at one end of the second lever; and means providing a selectively fixed or movable pivot at the other end of the second lever, whereby said last named pivot when fixed serves as a fulcrum about which the second lever may be rocked by the first lever via said force-transmitting connection to rock the rockshaft, and the pivot of said force-transmitting connection serves, when the first lever is fixed, as a fulcrum about which the second lever may be rocked by movement of said selectively fixed or movable pivot to cause rocking of the rockshaft via the arm.

3. For an agricultural vehicle-implement outfit in which the implement has an agricultural working part arranged to encounter agricultural conditions presenting resistances of varying magnitude to the operation of said part and said part being adjustable through a range of adjustment to selectively increase and decrease its working effort relative to such resistances: power means for adjusting the working part, comprising a fluid motor having a movable member connectible to the working part; a valve casing provided with a valve bore; a fluid transmission line connecting the valve bore and the motor; a fluid exhaust line leading from the bore; a control valve movable axially in the bore; a check valve biased to close the fluid transmission line and including an operating member; said control valve being shiftable axially in one direction to close the exhaust line so that the check valve is opened by fluid pressure, and shiftable axially in the other direction and having check-valve-actuating means connected thereto for engaging the check-valve-operating member to positively open the check valve; settable operating means on the outfit movable selectively in opposite directions; an operating connection between the operating means and the control valve including force-transmitting means having slack therein along the opposed lines of force transmitted thereby to the control valve when the operating means is moved respectively in opposite directions; and positive biasing means acting on the connection between the operating means and the control valve in such manner as to take up said slack in the direction opposed to the line of force that is exerted by the operating means when moved to cause engagement of the check-valve-actuating means with the check-valve-operating member.

4. For an agricultural vehicle-implement outfit in which the implement has an agricultural working part arranged to encounter agricultural conditions presenting resistances of varying magnitude to the operation of said part and said part being adjustable through a range of adjustment to selectively increase and decrease its working effort relative to such resistances: power means for adjusting the working part, comprising a fluid motor having a movable member connectible to the working part; a valve casing provided with a valve chamber; a fluid transmission line connecting the valve chamber and the motor; a fluid exhaust line leading from the chamber; a control valve movable in the chamber; a check valve biased to close the fluid transmission line and including an operating member; said control valve being shiftable in one phase to close the exhaust line so that the check valve is opened by fluid pressure, and shiftable in another phase and having check-valve-actuating means connected thereto for engaging the check-valve-operating member to positively open the check valve; settable operating means on the outfit movable selectively in opposite directions; an operating connection between the operating means and the control valve including force-transmitting means having slack therein along the opposed lines of force transmitted thereby to the control valve when the operating means is moved respectively in opposite directions; and positive biasing means acting on the connection between the operating means and the control valve in such manner as to take up said slack in the direction opposed to the line of force that is exerted by the operating means when moved to cause engagement of the check-valve-actuating means with the check-valve-operating member.

5. For an agricultural vehicle-implement outfit wherein the vehicle has a main body including an opening therein and the implement has a working part adapted to shift relative to the vehicle as such part encounters agricultural working conditions of varying magnitude, and wherein the vehicle has power means for adjusting the working part: an attachment means for the vehicle connectible between the working part and the power means, comprising a support having rigid thereon a hollow portion adapted for insertion into the vehicle body opening and further having attaching means for rigidly securing the support to the body; bearing means on the support; a rockshaft journaled in the bearing means; a control arm fixed at one end on the rockshaft and having its other end adapted for connection to the power means; an actuating arm fixed to the rockshaft and extending transverse to the hollow portion; biasing means received at least in part within the hollow portion and acting between the support and the actuating arm; and means on the actuating arm providing for connection thereof to the implement working part so that shifting of the part acts through the actuating arm and against the biasing means to rock the rockshaft and the control arm thereon.

6. The invention defined in claim 5, further characterized in that: the support carries therein means selectively settable to engage the actuating arm to limit the angular movement of the rockshaft relative to the support.

7. For an agricultural tractor-implement outfit wherein the tractor has a main body including at its rear an opening therein and the implement has a working part adapted to shift relative to the vehicle as such part encounters agricultural working conditions of varying magnitude, and wherein the tractor has power means for adjusting the working part: an attachment means for the tractor connectible between the working part and the power means, comprising a support having rigid thereon a sleeve adapted for insertion into the tractor body opening and further having attaching means for rigidly securing the support to the body; a bearing bracket on the support; a rockshaft journaled in the bearing bracket; a control arm fixed at one end on the rockshaft and having its other end adapted for connection to the power means; an actuating arm fixed to the rockshaft and extending transverse to the sleeve; biasing means received at least in part within the sleeve and acting between the support and the actuating arm; and means on the actuating arm providing for connection thereof to the implement working part so that shifting of the part acts through the actuating arm and against the biasing means to rock the rockshaft and the control arm thereon.

8. In an agricultural tractor-implement outfit having a hydraulic power means including a shiftable valve, a manual control lever, a movable work member for adjusting the implement, and draft means connecting the implement to the tractor and having a shiftable part responsive to changes in draft load, the improvement comprising: support means on the tractor; a rockshaft journaled on the support and having first and second arms fixed thereto; first force-transmitting means connected to the first arm and having means for connection to the valve; lever means rockable on the second arm and including third and fourth arms; second force-transmitting means for connecting the third arm to the manual control lever; and third force-transmitting means for connecting the fourth arm to the shiftable part.

9. In an agricultural tractor-implement outfit having a hydraulic power means including a movable work member for adjusting the implement and draft means connecting the implement to the tractor and including a part shiftable in response to changes in draft load, the improvement residing in control means for the power and draft means, comprising: a shiftable valve for selectively activating and deactivating the power means; a follow-up member connected to and movable with the work member; equalizer means interconnecting the valve and follow-up member; support means on the tractor; a selectively positionable control lever movably carried on the support means; a rockshaft journaled on the support and having first and second arms; force-transmitting means connecting the first arm to the equalizer means; lever means pivoted on the second arm and including third and fourth arms; second force-transmitting means connecting the third arm to the manual control lever; and third force-transmitting means connectig the fourth arm to the shiftable part.

10. For an agricultural vehicle-implement outfit of the character in which the implement has an agricultural working part adjustable by power means through a range of adjustment in which the part encounters agricultural resistances of varying magnitude which accordingly vary the operating load imposed on the vehicle, and in which the power means includes a selectively settable and resettable actuating member for activating and deactivating the power means, a positionable initiating member, a follow-up member operative in response to changes in adjustment of the implement part, and equalizer means interconnecting the three members and including a movable part for effecting initial setting and subsequent resetting of the actuating member respectively by the initiating member and the follow-up member: an automatic load control mechanism, comprising a settable, operator-responsive lever having means for the rockable mounting thereof on the vehicle-implement outfit; a rockable load-responsive lever having means for the connection thereof to the aforesaid initiating member; normally stable load-reflecting means connectible to the vehicle-implement outfit and capacitated to reflect variations in operating loads imposed on the vehicle; first force-transmitting means, including a pivot, connecting the load-reflecting means to the load-responsive lever; and second force-transmitting means, including a pivot, connecting the operator-responsive lever to the load-responsive lever, whereby the pivot of the load-responsive lever to the normally stable load-reflecting means serves as a fulcrum for rocking of the load-responsive lever by the operator-responsive lever to position the initiating member and thus to cause the equalizer part to set the actuating member, and the pivot in the connection of the load-responsive lever to the operator-responsive lever serves as a fulcrum for rocking of the load-responsive lever by the load-reflecting means to reposition the initiating member and thus to cause the equalizer part to reset the actuating member.

11. The invention defined in claim 10, in which: the operator-responsive lever-mounting means includes a rockshaft, and the operator-responsive lever is loose on the rockshaft; and the means for connecting the load-responsive lever to the initiating member includes an arm fixed to the rockshaft, the load-responsive lever is rockable on the arm, and the initiating member is positionable and repositionable by movement and reverse movement of the equalizer part respectively in response to swinging and reverse swinging of the arm.

12. For an agricultural vehicle-implement outfit of the character in which the implement has an agricultural working part adjustable by power means through a range of adjustment in which the part encounters agricultural resistances of varying magnitude which accordingly vary the operating load imposed on the vehicle, and in which the power means includes a selectively settable and resettable actuating member for activating and deactivating the power means, a positionable initiating member, a follow-up member operative in response to changes in adjustment of the implement part, and equalizer means interconnecting the three members and including a movable part for effecting initial setting and subsequent resetting of the actuating member respectively by the initiating member and the follow-up member: an automatic load control mechanism, comprising a rockshaft having means for the rockable mounting thereof on the vehicle-implement outfit; a first arm fixed to the rockshaft and connectible to the initiating member; a second arm fixed to the rockshaft; a load-responsive lever pivoted intermediate its ends to the free end of the second arm and having one end normally coaxial with the rockshaft; normally stable load-reflecting means connectible to the vehicle-implement outfit and capacitated to reflect variations in operating loads imposed on the vehicle; means pivotally connecting the load-reflecting means to the load-responsive lever at said one end of the latter; a settable, operator-responsive lever journaled coaxially with the rockshaft and extending radially in substantially the same direction as the other end of the load-responsive lever; and force-transmitting means, including a pivot at said other end of the load-responsive lever, interconnecting the two levers, whereby the pivot of the load-responsive lever to the normally stable load-reflecting means serves as a fulcrum for rocking of the load-responsive lever by the operator-responsive lever to rock the rockshaft via the force-transmitting means and the second arm to position the initiating member and thus to cause movement of the equalizer part to set the actuating member, and the pivot between the levers at said other end of the load-responsive lever serves as a fulcrum for rocking of the load-responsive lever by the load-reflecting means to rock the rockshaft via the second arm to reposition the initiating member and thus to cause reverse movement of the equalizer part to reset the actuating member.

References Cited in the file of this patent

UNITED STATES PATENTS

| | | |
|---|---|---|
| 1,687,719 | Ferguson | Oct. 16, 1928 |
| 2,356,231 | Ferguson | Aug. 22, 1944 |
| 2,477,710 | Worstell | Aug. 2, 1949 |
| 2,521,503 | Clark | Sept. 5, 1950 |
| 2,527,613 | Zagurski | Oct. 31, 1950 |
| 2,611,307 | Strehlow et al. | Sept. 23, 1952 |
| 2,631,514 | Roeder | Mar. 17, 1953 |
| 2,631,515 | McRae | Mar. 17 1953 |

FOREIGN PATENTS

| | | |
|---|---|---|
| 619,090 | Great Britain | Mar. 3, 1949 |
| 632,884 | Great Britain | Dec. 5, 1949 |